(12) United States Patent
Grindstaff et al.

(10) Patent No.: US 7,668,402 B2
(45) Date of Patent: Feb. 23, 2010

(54) METHOD FOR GENERATING A COMPOSITE IMAGE

(75) Inventors: Gene A. Grindstaff, Decatur, AL (US); Sheila G. Whitaker, Gurley, AL (US)

(73) Assignee: Intergraph Technologies Company, Las Vegas, NV (US)

( * ) Notice: Subject to any disclaimer, the term of this patent is extended or adjusted under 35 U.S.C. 154(b) by 810 days.

(21) Appl. No.: 10/982,386

(22) Filed: Nov. 5, 2004

(65) Prior Publication Data

US 2006/0097139 A1 May 11, 2006

(51) Int. Cl.
*G06K 9/36* (2006.01)
*G09G 5/00* (2006.01)

(52) U.S. Cl. ...................... 382/284; 345/629

(58) Field of Classification Search .............. 382/284, 382/305, 312, 178, 209, 218, 219, 294, 295, 382/296, 274; 345/619, 600, 629, 630, 665, 345/676

See application file for complete search history.

(56) References Cited

U.S. PATENT DOCUMENTS

| | | | | |
|---|---|---|---|---|
| 4,034,485 A | * | 7/1977 | Milutinovich | 434/155 |
| 5,450,504 A | | 9/1995 | Calia et al. | 382/118 |
| 6,642,918 B2 | | 11/2003 | Uchida et al. | 345/156 |
| 6,690,830 B1 | * | 2/2004 | Cote | 382/232 |
| 6,707,454 B1 | | 3/2004 | Barg et al. | 345/440 |
| 6,731,302 B1 | | 5/2004 | Côté | 345/619 |
| 7,003,140 B2 | * | 2/2006 | Venkatachalam | 382/118 |
| 7,289,647 B2 | * | 10/2007 | Cote | 382/118 |
| 2005/0231416 A1 | * | 10/2005 | Rowe et al. | 342/22 |

FOREIGN PATENT DOCUMENTS

EP 0704822 A 4/1996

OTHER PUBLICATIONS

Gillenson et al., "A Heuristic Strategy for Developing Human Facial Images on a CRT," Pattern Recognitiion UK, vol. 7, No. 4, pp. 187-196, Dec. 1975.
Brunelli et al., "SpotIt! An Interactive Identikit System," CVGIP Graphical Models and Image Processing, vol. 58, No. 5, pp. 399-404, Sep. 1996.
Sakai et al., "Computer Analysis and Classification of Photographs of Human Faces," USA-Japan Computer Conference Proceedings, vol. Conf. 1, pp. 2701-2708, Oct. 3-5, 1972.
International Search Report, PCT/US2005/035075, Sep. 27, 2005, 5 pages.
Faces 4.0 for Law Enforcement, www.iqbiometrix.com/products_faces_40.html, pp. 1-4, Jul. 15, 2003.
Communication pursuant to Article 94(3) EPC, European Patent Office, Dec. 22, 2008, 6 pages.
Brunelli, Roberto and Poggio, Tomaso,*Face Recognition: Features versus Templates*, IEEE Transactions on Pattern Analysis and Machine Intelligence, vol. No. 10, Oct. 15, 1993, pp. 1042-1052.

* cited by examiner

*Primary Examiner*—Kanji Patel
(74) *Attorney, Agent, or Firm*—Sunstein Kann Murphy & Timbers LLP

(57) ABSTRACT

A method for generating a composite image includes receiving a separate image into a computer system, comparing the separate image to the composite image so as to generate a mismatch value, and modifying at least one of the composite image and the separate image to reduce the mismatch value.

46 Claims, 6 Drawing Sheets

METHOD FOR GENERATING A COMPOSITE IMAGE

TECHNICAL FIELD

The present invention relates to video processing, and, more particularly, to generating a composite image.

BACKGROUND

Often, there is a need to identify a person through comparison of the person's face with a recorded image of a face. Such situations regularly arise in police investigations where, for example, the police search for a suspect on the basis of a security camera image.

Difficulty arises when the image used for comparison is of poor quality. The lighting in the store might have been poor. The subject might not have been facing the camera or part of the subject's face might have been hidden by bystanders. The image might have been recorded on a medium such as magnetic tape subject to deterioration.

There are advantages in converting the recorded image to a standard frontal and profile composite image similar to the image composed by a person under the guidance of a police artist. Such an image can easily be the basis for comparison. The image can maintain its fidelity despite noise added in transmission and copying. The image can be updated to allow for the passage of time or for modifications associated with a particular area, such as a beard.

Construction of a composite image is an interactive process. A witness working with a police artist guides manipulation of the appearance and location of features such as ears and eyes until she feels that the composite image resembles her memory of the face. A person working with a separate image of a face instead of with a witness has the advantage of not relying on memory. However, the person working with a separate image, lacking a witness to tell him when to stop, relies on his own criteria in deciding when resemblance of the composite image to the separate image is close enough. With an unlimited number of combinations of features and locations available, the person working with a separate image may find himself trying one combination after another, unable to home in on the combination associated with a composite image most similar to the separate image.

SUMMARY OF THE INVENTION

In accordance with one aspect of the invention, a method for generating a composite image from a separate image includes receiving the separate image into a computer system and comparing the separate image to the composite image, producing a mismatch value in the process. At least one of the composite image and the separate image is modified so as to reduce the mismatch value.

In some embodiments, a nondigital image may be digitized to form a separate image.

In certain embodiments, a method for generating a composite image may include modifying a feature such as a mouth, a nose, an eye, an eyebrow, and ear, a hairstyles and a face shape and the location of the feature in the composite image.

In other embodiments, a method for generating a composite image may include modifying a position, an orientation, a size, and an appearance in the separate image. A method for generating a composite image may include displaying a toolbar for modifying the separate image, and, may further include displaying toolbar buttons for modifying the position of the separate image by shifting the separate image left, right, up, and down, for modifying the orientation of the separate image by rotation clockwise and counterclockwise, by modifying the size of the separate image by enlargement and reduction, and for modifying the appearance of the separate image by selection of a color and grayscale image. Further, the toolbar may include buttons for increasing the intensity of the composite image and decreasing the intensity of the separate image and for decreasing the intensity of the composite image and increasing the intensity of the separate image.

In illustrative embodiments, a method for generating a composite image may include displaying an overlay image containing the modified composite image and the modified separate image, where the modified composite image and the modified separate image may be displayed individually.

In still further embodiments, a method for generating a composite image may include comparing the separate image to the composite image pixel by pixel. Blank white areas of the composite image may be treated as blank black areas. A composite image average light level may be calculated and subtracted from composite image. A separate image average light level may be calculated and subtracted from the separate image.

In accordance with a further aspect of the invention, a method for calculating a mismatch value includes calculating an overlaid composite image average pixel intensity includes calculating an adjusted overlaid composite image pixel intensity by subtracting the overlaid composite image average pixel intensity from an intensity of each pixel in the overlaid composite image, calculating an overlaid separate image average pixel intensity, calculating an adjusted overlaid separate image pixel intensity by subtracting the overlaid separate image average pixel intensity from an intensity of each pixel in the overlaid separate image, calculating an overlaid pixel intensity difference by subtracting each adjusted overlaid composite image pixel intensity from the adjusted separate image pixel intensity for each pixel, calculating an overlaid pixel intensity difference absolute value for each pixel, calculating a total overlaid intensity difference by adding the overlaid pixel intensity difference absolute value of all pixels, calculating a total overlaid separate intensity difference by adding the adjusted overlaid separate image pixel intensities of all pixels, and calculating a mismatch value by dividing the total overlaid intensity difference by the total overlaid separate image intensity difference.

In accordance with an additional aspect of the invention, a system for generating a composite image based on a separate image includes means for receiving a separate image, means for comparing the separate image to the composite image, producing a mismatch, value, and means for modifying at least one of the composite image and the separate image to reduce the mismatch value.

In certain embodiments, means for receiving may include an antenna and means for comparing the separate image to the composite image may include a computer and a monitor. The computer may include a memory storing a computer code for execution by the computer to compare the separate image to the composite image and produce a mismatch value. The means for modifying at least one of the composite image and the separate image to reduce the mismatch value may include a device for selecting a modification. The selection device may include a mouse.

In accordance with another aspect of the invention, a computer program product for use on a computer system for generating a composite image based on a separate image comprises a computer usable medium having computer readable program code where the computer readable program code includes program code for comparing the separate image to the composite image, producing a mismatch value and program code for modifying at least one of the composite image and the separate image to reduce the mismatch value.

In additional embodiments, the program code for comparing the separate image to the composite image may include program code for calculating an overlaid composite image average pixel intensity, program code for calculating an adjusted overlaid composite image pixel intensity by subtracting the overlaid composite image average pixel intensity from an intensity of each pixel in the overlaid composite image, program code for calculating an overlaid separate image average pixel intensity, program code for calculating an adjusted overlaid separate image pixel intensity by subtracting the overlaid separate image average pixel intensity from an intensity of each pixel in the overlaid separate image, program code for calculating an overlaid pixel intensity difference by subtracting each adjusted overlaid composite image pixel intensity from the adjusted separate image pixel intensity for each pixel, program code for calculating an overlaid pixel intensity difference absolute value for each pixel, program code for calculating a total overlaid intensity difference by adding thee overlaid pixel intensity difference absolute value of all pixels, program code for calculating a total overlaid separate intensity difference by adding the adjusted overlaid separate image pixel intensities of all pixels, and program code for calculating a mismatch value by dividing the total overlaid intensity difference by the total overlaid separate image intensity difference.

In other embodiments, the program code for modifying at least one of the composite image and the separate image to reduce the mismatch value may include program code for incorporating a feature into the composite image, program code for modifying the location of a feature in the composite image, program code for modifying at least one of a position, an orientation, a size, and an appearance of the separate image, program code for modifying the position of the separate image by shifting the separate image left, right, up, and down, program code for modifying the orientation of the separate image by rotating the separate image clockwise and counterclockwise, program code for modifying the size of the separate image by enlargement and by reduction, program code for modifying the appearance of the separate image by selecting to display the separate image in color and in grayscale, and program code for increasing the intensity of the composite image and decreasing the intensity of the separate image and for decreasing the intensity of the composite image and increasing the intensity of the separate image.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A composite image is a digital image of an individual created by individual selection and assembly of features to represent the appearance of the individual.

A separate image is a digital representation of an actual image taken of an individual.

An overlay image is a digital image of the composite image overlaying the separate image. In overlaying the composite image onto the separate image, the sizes, orientations, positions, and intensities of the images may be modified before intensities at corresponding pixels for the modified composite and separate images are combined. Combining may correspond to summing the intensities at corresponding pixels for the modified composite and separate images, followed by averaging the sum.

In one embodiment, the present invention enables a composite image to be created and compared to a separate image. Based on the comparison, the composite image may be edited to better resemble the separate image through use of an indicator of resemblance between the composite and separate images.

Figure 1:
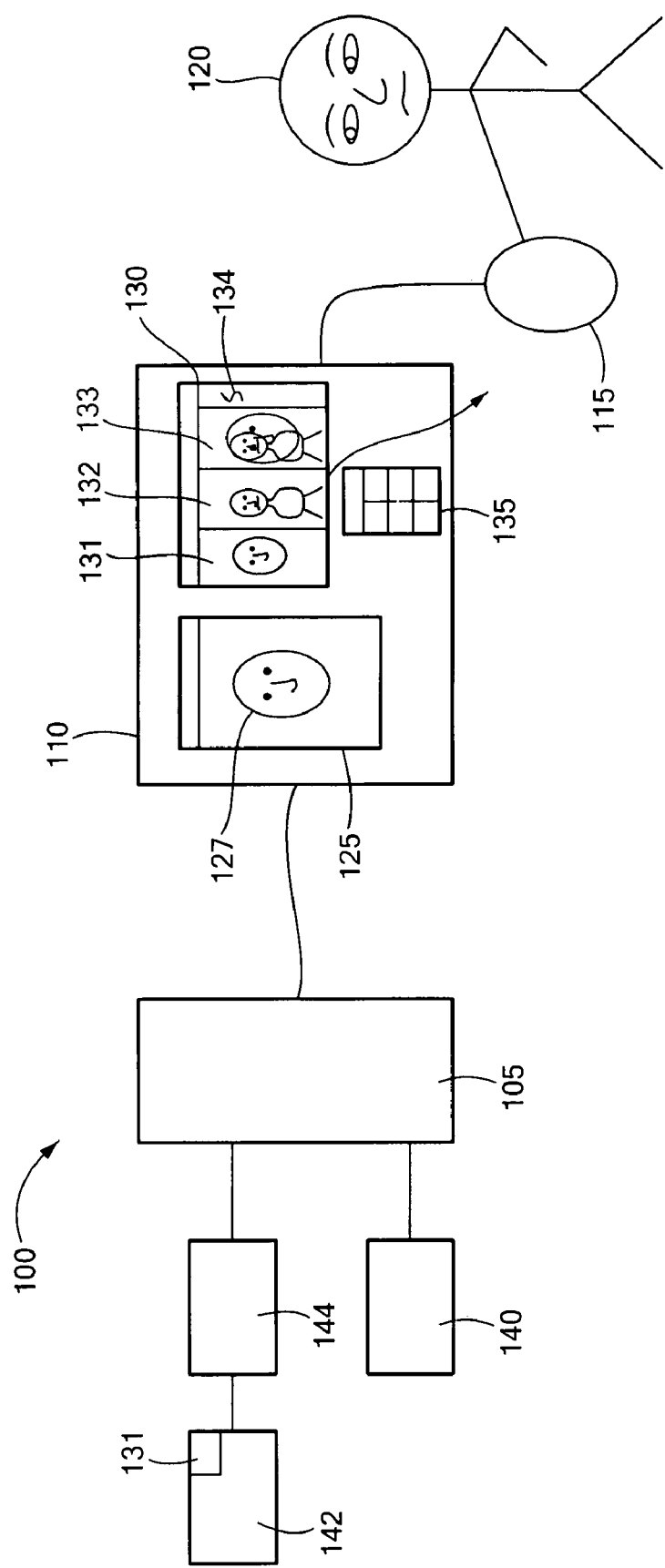
FIG. 1 is a schematic illustration of a computer system for generating a composite image.

FIG. 1 shows a computer system 100 containing a computer 105, a display 110, and a mouse 115 on which a computer program for generating a composite image operates. One example of an existing composite image generating program is Faces, The Ultimate Composite Picture™. Using the composite image generating program, an operator 120 displays and modifies a composite image 127.

Figure 2:
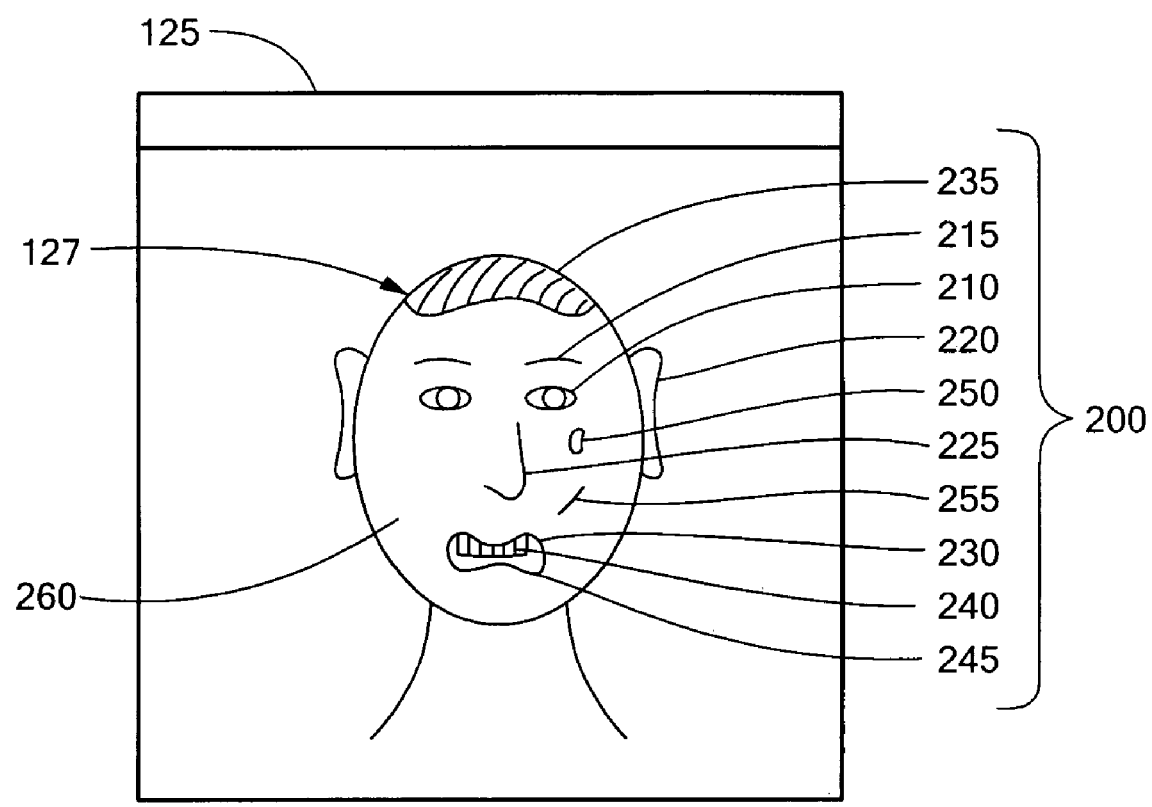
FIG. 2 illustrates a computer display window including a composite image.

FIG. 2 shows a composite image window 125 associated with the composite image generating program on the display 110. The composite image 127 contained in composite image window 125 reflects all of the insertions, deletions, and modifications of features. The operator 120 selects features 200 from a library that includes features such as eyes 210, eyebrows 215, ears 220, noses 225, mouths 230, lips 245, teeth 240, hairstyles 235, moles 250, scars 255, and faces 260. The operator may further select features 200 on the basis of qualities such as color (e.g., eyes, hair, and face), shape (e.g., eyes, face, ears, and nose), and orientation (e.g., eyes and face). The operator may alter feature locations by dragging a feature 200 across the display 110 of the composite image 127 under the control of the mouse 115.

Figure 3:
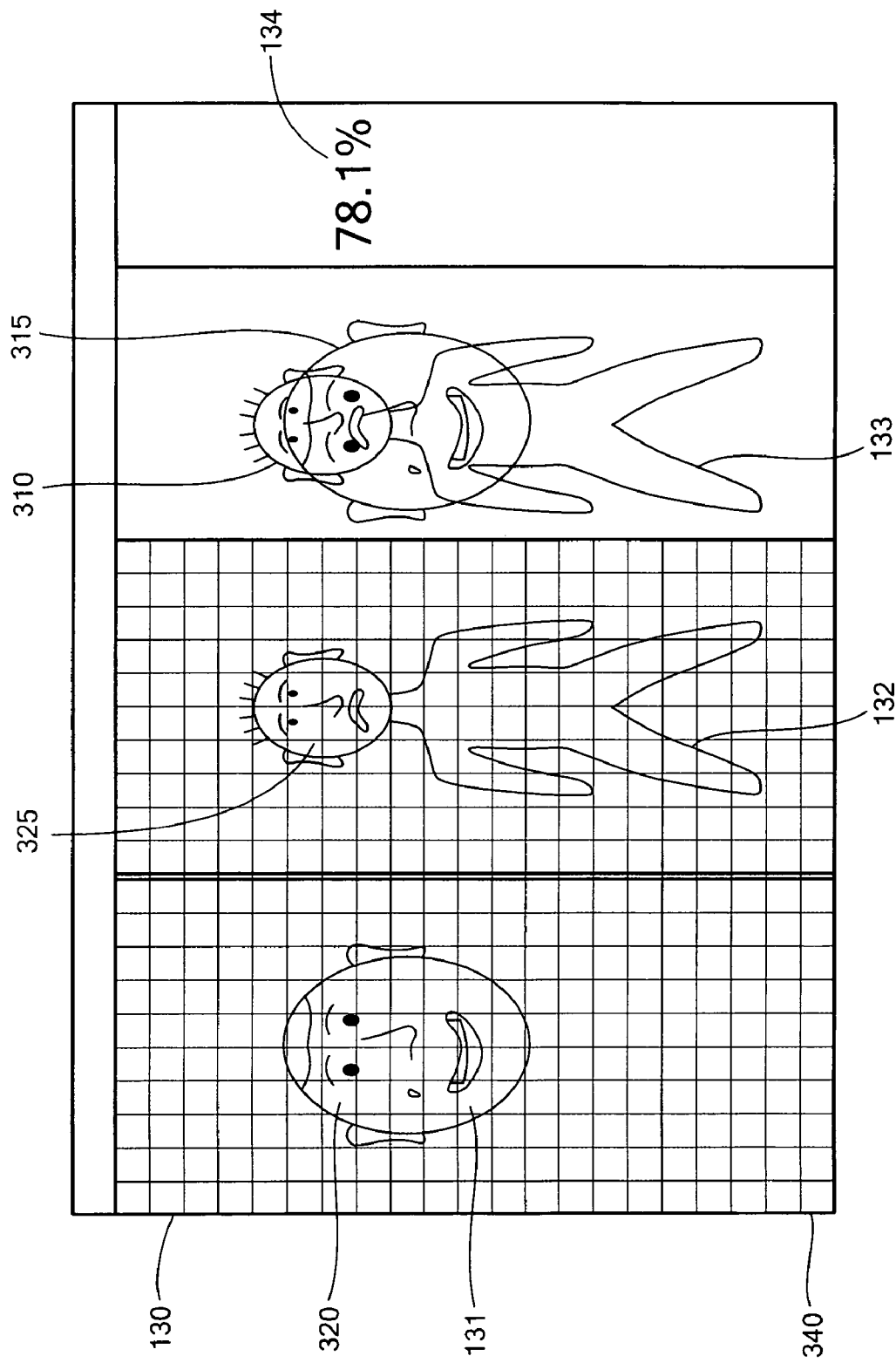
FIG. 3 illustrates a computer display window including a composite image, a separate image, an overlay image, and a mismatch value.

FIG. 3 shows a composite image evaluation window 130 also located on the display 110. The composite image evaluation window 130 includes three images: a composite image 131, a separate image 132, and an overlay image 133. On the left is the composite image 131, a copy of composite image 127 associated with the composite image window 125 and is regularly updated, for example, every 500 milliseconds. In the middle is the separate image 132. On the right is the overlay image 133 that includes the composite image 131 overlaying the separate image 132. The composite image evaluation window 130 also contains a Mismatch value 134. As the operator 120 alters the composite image 131 to match the separate image 132, the Mismatch value 134 varies from a value approximately equal to 1 that is indicative of a complete mismatch to a value approximately equal to 0 that is indicative of a perfect match.

The separate image 132, in digital form, is stored in the computer 105 from a digital source 140 that may include a digital camera and the Internet and from a nondigital source 142 that may include a film camera and a video cassette recorder (VCR). A nondigital image 131 from nondigital source 142 is first digitized by a digitizer 144 before being stored as separate image 132. The separate image 132 may be a file type such as BMP, JPEG, WMF, GIF, PNG, TIFF, and Exif. Prior to comparison of the composite image 131 with the separate image 132, the separate image 132 may be modified to remove or reduce the influence of aspects not dependent on features 200. Examples of modifications to the separate image 132 include shifting (up, down, left, and right), rotation (clockwise and counterclockwise), sizing (enlargement and reduction), and display (color and grayscales).

The cumulative effects of the above modifications to the separate image 132 are displayed in the overlay image 133 where the composite image 315 is overlaid with the modified separate image 310. The overlaid composite 315 and the modified separate 310 images may be further modified relative to one another. The intensity of the overlaid modified composite image 315 may be increased and the intensity of the overlaid modified separate image 310 decreased or the intensity of the overlaid modified separate image 310 may be decreased and the intensity of the overlaid modified composite image 315 decreased.

Figure 4:
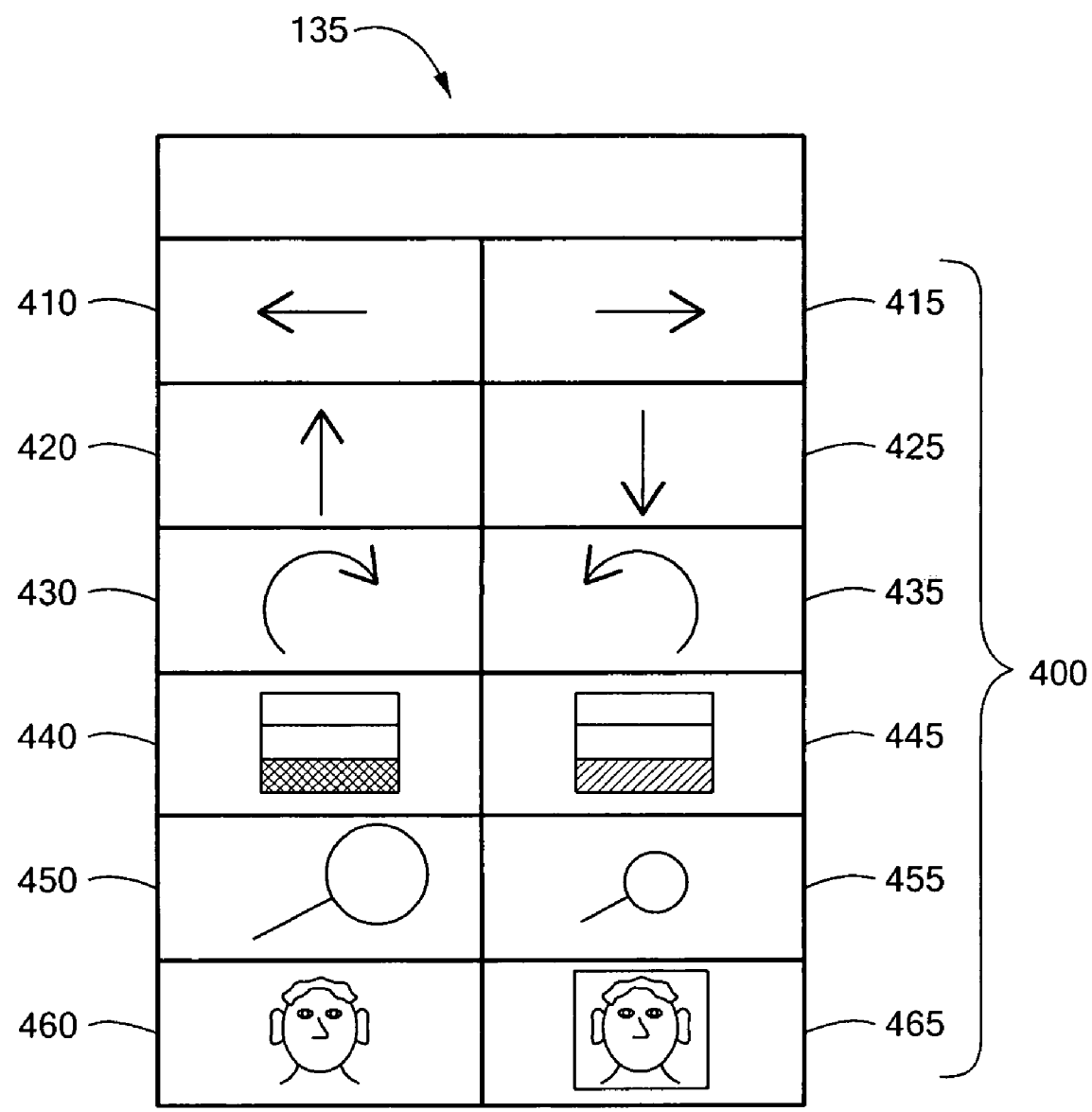
FIG. 4 illustrates a toolbar containing buttons for modifying a separate image and a composite image.

FIG. 4 illustrates an embodiment of a toolbar 135 incorporated into the display 110 for implementing modifications to the overlaid separate 310 and overlaid composite 315 images. The toolbar 135 may contain buttons 400 for effecting modifications to the overlaid separate image 310 (shifting up 420, down 425, left 410, and right 415; rotation clockwise 430 and counterclockwise 435; enlargement 450 and reduction 455; display in color 440 and in greyscale 445) and to the overlaid separate image 310 relative to the overlaid composite image 315 (increase overlaid separate image intensity and decrease overlaid composite image intensity 465; decrease overlaid separate image intensity and increase overlaid composite image intensity 460). The operator 120 may use the mouse 115 to selectively apply the modifications by selecting particular buttons. Each selection of a button 400 may apply a small increment of the indicated change, thereby allowing the operator 120 to make fine adjustments to the overlaid images 310 and 315.

For each overlay image 133 containing an overlaid composite image 315 and an overlaid separate image 310, the display 110 also contains a Mismatch value 134. The overlaid composite image 315 and the overlaid separate image 310 are displayed at the same resolution, i.e., as similar numbers of pixels, for example, corresponding to arrays of 600×800 pixels. The Mismatch value 134 quantifies the resemblance of the overlaid composite image 315 with the overlaid separate image 310 and is calculated on a pixel by pixel basis.

Figure 5:
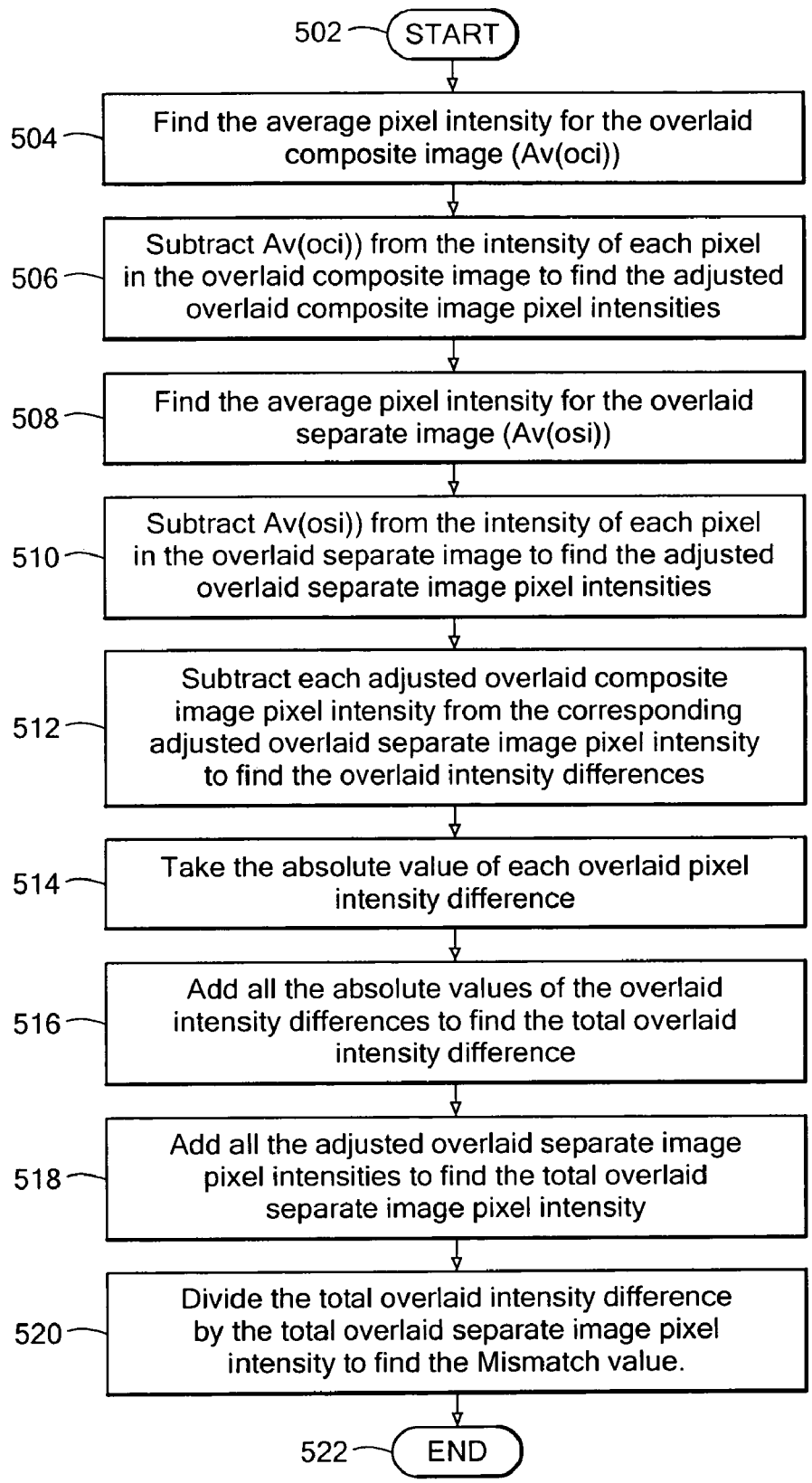
FIG. 5 illustrates a process for calculating a mismatch value.

FIG. 5 illustrates the process 500 for calculation of the Mismatch value 134. In step 504, the intensities of all of the pixels in the overlaid composite image 315 are added and divided by the total number of pixels in the overlaid composite image 315 to find the average pixel intensity for the overlaid composite image 315, Av(oci). In step 506, Av(oci) is subtracted from the intensity of each pixel in the overlaid composite image 315 to find the adjusted overlaid composite image pixel intensities. In step 508, the intensities of all of the pixels in the overlaid separate image 310 are added and divided by the total number of pixels in the overlaid separate image 310 to find the average pixel intensity for the overlaid separate image, Av(osi). In step 510, Av(osi) is subtracted from the intensity of each pixel in the overlaid separate image 310 to find the adjusted overlaid separate image pixel intensities. In step 512, each adjusted overlaid composite image pixel intensity is subtracted from the corresponding adjusted overlaid separate image pixel intensity to find the overlaid pixel intensity differences. (Corresponding overlaid composite and separate image pixels have the same relative location in the image, i.e. the same horizontal and vertical position, as indicated schematically with pixels 320 and 325 in FIG. 3). Equivalently, each adjusted overlaid separate image pixel intensity may be subtracted from the corresponding adjusted overlaid composite image pixel intensity to find the overlaid pixel intensity differences. In step 514, the absolute value is taken of each overlaid pixel intensity difference. In step 516, the absolute values of all overlaid pixel intensity differences are added to find the total overlaid pixel intensity difference. In step 518, all the adjusted overlaid separate image pixel intensities are added to find the total overlaid separate image pixel intensity. In step 520, the total overlaid pixel intensity difference is divided by the total overlaid separate image pixel intensity to find the Mismatch value 134.

Prior to calculation of the Mismatch value 134, the intensities of the pixels of the overlaid composite image and separate image may be adjusted to eliminate systemic differences between the overlaid images. The backgrounds of the overlaid composite image and overlaid separate image may be made the same intensity. Since the background of the composite image is often white and the background of the separate image dark, the background of the overlaid composite image may be treated as black in the calculation of the Mismatch value 134 to yield a lower Mismatch value 134 with less skewing than would result from absolute pixel comparison.

As the operator 120 changes the composite image 127, the Mismatch value 134 changes accordingly, increasing as a result of a poorer match and decreasing as a result of a better match. The composite image 127 corresponding to the best match to date may be stored in the computer 105. When the Mismatch value 134 first reaches a predetermined threshold value or when the Mismatch value 134 fails to fall below the Mismatch value of the currently stored best composite image over a predetermined number of changes to the composite image, the currently stored best composite image may be declared to be the final composite image.

Figure 6:
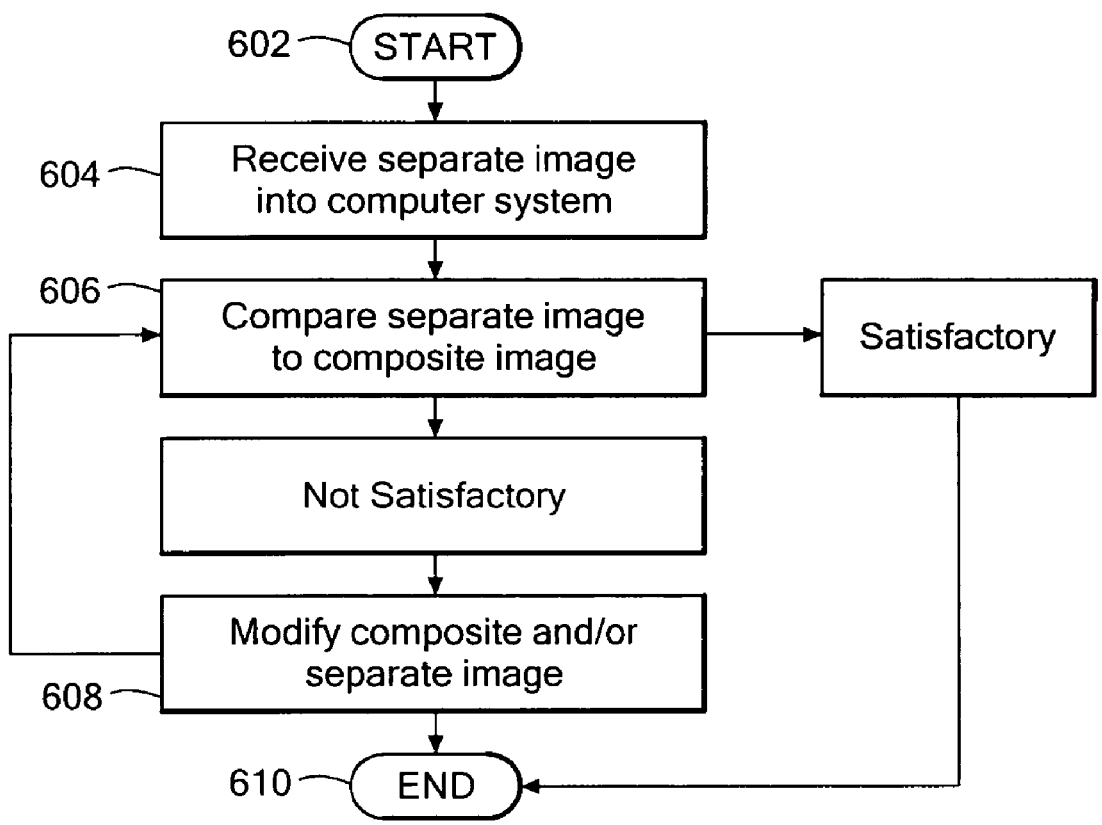
FIG. 6 illustrates the process for generating the composite image based on the separate image.

FIG. 6 illustrates the process 600 for generating the composite image based on the separate image 132. In step 604, the computer system receives the separate image. In step 606, the separate image 132 is compared with the composite image 131, producing the Mismatch value 134 in the process. If the Mismatch value 134 is satisfactory, the process 600 ends. If the Mismatch value 134 is not satisfactory, the process 600 proceeds to step 608 where at least one of the composite image 131 and the separate image 132 is modified to reduce the Mismatch value 134. Process 600 then returns to step 606 for another comparison.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although various exemplary embodiments of the invention are disclosed above, it should be apparent that those skilled in the art can make various changes and modifications that will achieve some of the advantages of the invention without departing from the true scope of the invention.

What is claimed is:

1. A method for generating a composite image in a computer based on a separate image, the method comprising:
   receiving the separate image into a computer system;
   using a digital process, comparing the separate image to the composite image in the computer pixel by pixel, producing a mismatch value; and
   modifying at least one of the composite image and the separate image to reduce the mismatch value, thereby generating a final composite image.

2. A method for generating a composite image according to claim 1, further including digitizing a nondigital image to form the separate image.

3. A method for generating a composite image according to claim 1, wherein modifying the composite image includes incorporating a feature into the composite image.

4. A method for generating a composite image according to claim 3, wherein the feature includes at least one of a mouth, a nose, an eye, an eyebrow, an ear, a hairstyle, and a face shape.

5. A method for generating a composite image according to claim 3, wherein modifying the composite image includes modifying the location of the feature in the composite image.

6. A method for generating a composite image according to claim 1, wherein modifying the separate image includes modifying at least one of a position, an orientation, a size, and an appearance of the separate image.

7. A method for generating a composite image according to claim 1, wherein modifying includes displaying a toolbar.

8. A method for generating a composite image according to claim 7, wherein displaying a toolbar includes displaying buttons for modifying the position of the separate image by shifting the separate image left, right, up, and down.

9. A method for generating a composite image according to claim 7, wherein displaying a toolbar includes displaying buttons for modifying the orientation of the separate image by rotating the separate image clockwise and counterclockwise.

10. A method for generating a composite image according to claim 9, wherein displaying buttons for modifying the orientation of the separate image includes displaying a button for rotating the separate image clockwise.

11. A method for generating a composite image according to claim 9, wherein displaying buttons for modifying the orientation of the separate image includes displaying a button for rotating the separate image counterclockwise.

12. A method for generating a composite image according to claim 7, wherein displaying a toolbar includes displaying buttons for modifying the size of the separate image by enlargement and by reduction.

13. A method for generating a composite image according to claim 7, wherein displaying a toolbar includes displaying buttons for modifying the appearance of the separate image by selecting to display the separate image in color and in grayscale.

14. A method for generating a composite image according to claim 7, wherein displaying a toolbar includes displaying buttons for increasing the intensity of the composite image and decreasing the intensity of the separate image and for decreasing the intensity of the composite image and increasing the intensity of the separate image.

15. A method for generating a composite image according to claim 1, further including displaying an overlay image containing the modified composite image and the modified separate image.

16. A method for generating a composite image according to claim 15, further including individually displaying the modified composite image and the modified separate image.

17. A method for generating a composite image according to claim 1, wherein comparing the separate image to the composite image includes treating blank white areas of the composite image as if the blank white areas were blank black areas.

18. A method according to claim 1, wherein comparing the separate image to the composite image includes calculating an average light level for the composite image and subtracting the average composite image light level from the composite image.

19. A method according to claim 1, wherein comparing the separate image to the composite image includes calculating an average light level for the separate image and subtracting the separate image average light level from the separate image.

20. A computer program product for use on a computer system for calculating a mismatch value between an overlaid composite image and an overlaid separate image, the computer program product comprising a computer usable medium having computer readable program code thereon, the computer readable program code comprising program code for:
   calculating an overlaid composite image average pixel intensity;
   calculating an adjusted overlaid composite image pixel intensity by subtracting the overlaid composite image average pixel intensity from an intensity of each pixel in the overlaid composite image;
   calculating an overlaid separate image average pixel intensity;

calculating an adjusted overlaid separate image pixel intensity by subtracting the overlaid separate image average pixel intensity from an intensity of each pixel in the overlaid separate image;

calculating an overlaid pixel intensity difference by subtracting each adjusted overlaid composite image pixel intensity from the adjusted overlaid separate image pixel intensity for each pixel;

calculating an overlaid pixel intensity difference absolute value for each pixel;

calculating a total overlaid pixel intensity difference by adding the overlaid pixel intensity difference absolute value of all pixels;

calculating a total overlaid separate image pixel intensity by adding the adjusted overlaid separate image pixel intensities of all pixels; and calculating a mismatch value by dividing the total overlaid pixel intensity difference by the total overlaid separate image pixel intensity.

21. A system for generating a composite image based on a separate image, the system comprising:

means for receiving the separate image;

means for comparing the separate image to the composite image pixel by pixel, producing a mismatch value; and means for modifying at least one of the composite image and the separate image to reduce the mismatch value, thereby generating a final composite image.

22. A system for generating a composite image according to claim 21, wherein the means for receiving includes an antenna.

23. A system for generating a composite image according to claim 21, wherein the means for comparing the separate image to the composite image includes a computer and a monitor.

24. A system for generating a composite image according to claim 21, wherein the computer includes a memory storing a computer code for execution by the computer to compare the separate image to the composite image and produce a mismatch value.

25. A system for generating a composite image according to claim 21, wherein the means for modifying at least one of the composite image and the separate image to reduce the mismatch value includes a device for selecting a modification.

26. A system for generating a composite image according to claim 25, wherein the selection device includes a mouse.

27. A computer program product for use on a computer system for generating a composite image based on a separate image, the computer program product comprising a computer usable medium having computer readable program code thereon, the computer readable program code comprising:

program code for comparing the separate image to the composite image pixel by pixel, producing a mismatch value; and program code for modifying at least one of the composite image and the separate image to reduce the mismatch value, thereby generating a final composite image.

28. A computer program product according to claim 27, wherein the program code for comparing the separate image to the composite image, producing a mismatch value, includes program code for calculating an overlaid composite image average pixel intensity.

29. A computer program product according to claim 28, wherein the program code for comparing includes program code for calculating an adjusted overlaid composite image pixel intensity by subtracting the overlaid composite image average pixel intensity from an intensity of each pixel in the overlaid composite image.

30. A computer program product according to claim 29, wherein the program code for comparing includes program code for calculating an overlaid separate image average pixel intensity.

31. A computer program product according to claim 30, wherein the program code for comparing includes program code for calculating an adjusted overlaid separate image pixel intensity by subtracting the overlaid separate image average pixel intensity from an intensity of each pixel in the overlaid separate image.

32. A computer program product according to claim 31, wherein the program code for comparing includes program code for calculating an overlaid pixel intensity difference by subtracting each adjusted overlaid composite image pixel intensity from the adjusted overlaid separate image pixel intensity for each pixel.

33. A computer program product according to claim 32, wherein the program code for comparing includes program code for calculating an overlaid pixel intensity difference absolute value for each pixel.

34. A computer program product according to claim 33, wherein the program code for comparing includes program code for calculating a total overlaid pixel intensity difference by adding the overlaid pixel intensity difference absolute value of all pixels.

35. A computer program product according to claim 34, wherein the program code for comparing includes program code for calculating a total overlaid separate image pixel intensity by adding the adjusted overlaid separate image pixel intensities of all pixels.

36. A computer program product according to claim 35, wherein the program code for comparing includes program code for calculating a mismatch value by dividing the total overlaid pixel intensity difference by the total overlaid separate image pixel intensity.

37. A computer program product according to claim 27 wherein the program code for modifying at least one of the composite image and the separate image to reduce the mismatch value includes program code for incorporating a feature into the composite image.

38. A computer program product according to claim 37 wherein the program code for modifying at least one of the composite image and the separate image to reduce the mismatch value includes program code for modifying the location of the feature in the composite image.

39. A computer program product according to claim 27 wherein the program code for modifying at least one of the composite image and the separate image to reduce the mismatch value includes program code for modifying at least one of a position, an orientation, a size, and an appearance of the separate image.

40. A computer program product according to claim 39 wherein the program code for modifying at least one of the composite image and the separate image to reduce the mismatch value includes program code for modifying the position of the separate image by shifting the separate image left, right, up, and down.

41. A computer program product according to claim 39 wherein the program code for modifying at least one of the composite image and the separate image to reduce the mismatch value includes program code for modifying the orientation of the separate image by rotating the separate image clockwise and counterclockwise.

42. A computer program product according to claim 39 wherein the program code for modifying at least one of the composite image and the separate image to reduce the mismatch value includes program code for modifying the size of the separate image by enlargement and by reduction.

43. A computer program product according to claim 39 wherein the program code for modifying at least one of the composite image and the separate image to reduce the mismatch value includes program code for modifying the appearance of the separate image by selecting to display the separate image in color and in grayscale.

44. A computer program product according to claim 39 wherein the program code for modifying at least one of the composite image and the separate image to reduce the mismatch value includes program code for increasing the intensity of the composite image and decreasing the intensity of the separate image and for decreasing the intensity of the composite image and increasing the intensity of the separate image.

45. A method for generating a composite image in a computer based on a separate image, the method comprising:
  receiving the separate image into a computer system;
  using a digital process, comparing the separate image to the composite image in the computer, producing a mismatch value;
  modifying at least one of the composite image and the separate image to reduce the mismatch value, thereby generating a final composite image, wherein modifying the separate image includes modifying at least one of a position, an orientation, a size, and an appearance of the separate image; and
  displaying a toolbar on a display coupled to the computer that includes buttons for increasing the intensity of the composite image and decreasing the intensity of the separate image and for decreasing the intensity of the composite image and increasing the intensity of the separate image.

46. A computer program product for use on a computer system for generating a composite image based on a separate image, the computer program product comprising a computer usable medium having computer readable program code thereon, the computer readable program code comprising:
  program code for comparing the separate image to the composite image including program code for:
    (a) calculating an overlaid composite image average pixel intensity,
    (b) calculating an adjusted overlaid composite image pixel intensity by subtracting the overlaid composite image average pixel intensity from an intensity of each pixel in the overlaid composite image,
    (c) calculating an overlaid separate image average pixel intensity,
    (d) calculating an adjusted overlaid separate image pixel intensity by subtracting the overlaid separate image average pixel intensity from an intensity of each pixel in the overlaid separate image,
    (e) calculating an overlaid pixel intensity difference by subtracting each adjusted overlaid composite image pixel intensity from the adjusted overlaid separate image pixel intensity for each pixel,
    (f) calculating an overlaid pixel intensity difference absolute value for each pixel,
    (g) calculating a total overlaid pixel intensity difference by adding the overlaid pixel intensity difference absolute value of all pixels,
    (h) calculating a total overlaid separate image pixel intensity by adding the adjusted overlaid separate image pixel intensities of all pixels,
    (i) calculating a mismatch value by dividing the total overlaid pixel intensity difference by the total overlaid separate image pixel intensity, producing a mismatch value; and
  program code for modifying at least one of the composite image and the separate image to reduce the mismatch value, thereby generating a final composite image.

* * * * *